J. B. MERIAM.
FLEXIBLE COUPLING.
APPLICATION FILED MAY 29, 1911.

1,069,454.

Patented Aug. 5, 1913.

Witnesses
Brennan B. West
Hugh B. McGill

Inventor
Joseph B. Meriam
by Albert H. Baker
Atty

UNITED STATES PATENT OFFICE.

JOSEPH B. MERIAM, OF CLEVELAND, OHIO, ASSIGNOR TO THE BRUCE-MACBETH ENGINE COMPANY, OF CLEVELAND, OHIO, A CORPORATION OF OHIO.

FLEXIBLE COUPLING.

1,069,454.          Specification of Letters Patent.        Patented Aug. 5, 1913.

Application filed May 29, 1911. Serial No. 630,097.

*To all whom it may concern:*

Be it known that I, JOSEPH B. MERIAM, a citizen of the United States, residing at Cleveland, in the county of Cuyahoga and State of Ohio, have invented a certain new and useful Improvement in Flexible Couplings, of which the following is a full, clear, and exact description, reference being had to the accompanying drawings.

The object of this invention is to provide a sensitive and efficient flexible coupling enabling a driven member to rotate with great regularity, notwithstanding momentary variations in the rotation of the driving member.

My prior Patent #803,006, granted October 31, 1905, shows a coupling having a series of links arranged in a polygon, which is connected at its salient angles alternately to the driving and driven member, such coupling being very useful in enabling the driving and driven shafts to stand out of alinement. In the present invention I avail myself of the advantages of the coupling referred to and endow it with rotative flexibility by spreading adjacent straps of alternate links and placing between them compression springs. By this means, the driving member, in starting, compresses the springs and if there should be a momentary lag in the driving action, the springs reacting enable the driven member to continue its speed by momentum at substantially undiminished rate. The rotative flexibility of the present coupling, enabling very uniform driving action, is of value in many instances; for example, I may cite the operation of dynamo electric machines for lighting tungsten lamps. In such use, there must be extreme regularity of rotation of the dynamo to avoid flickering. My coupling enables the dynamo to be so rotated by a gas engine.

The invention, in its broad aspect, consists of a pair of flexible links side by side connecting the driving and driven member and acting on a spring, whereby longitudinal movement of the links is allowed under control of the spring. In its more particular embodiment, these links are arranged with other links in a polygon connected at the salient angles with the driving and driven member, respectively, and the springs are coiled compression springs located between the driving links.

The invention is hereinafter more fully described and its characteristics are summarized in the claims.

Figure 1:
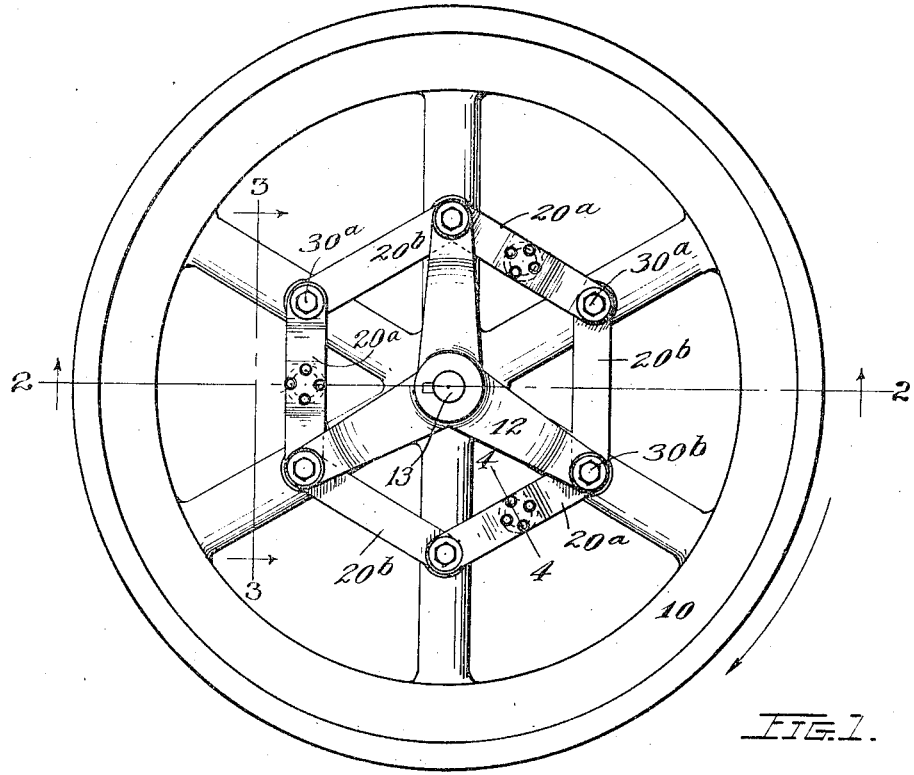
Figure 2:
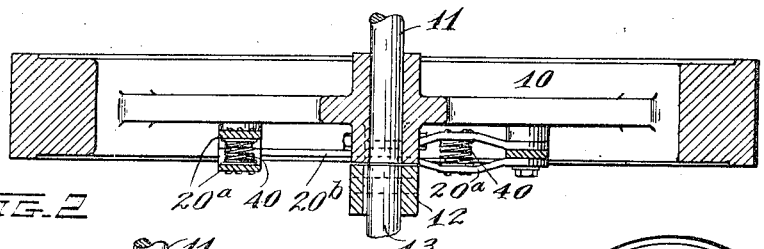
Figure 3:
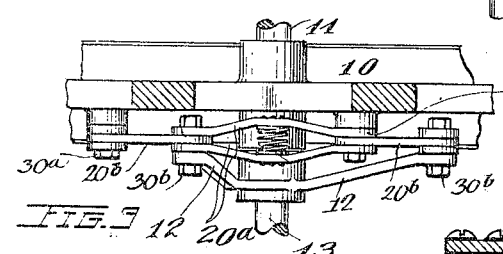
Figure 5:
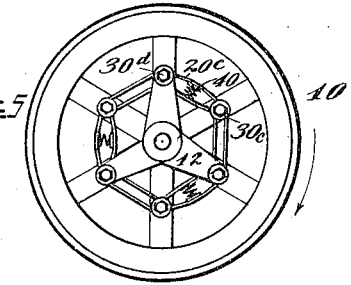
Figure 4:
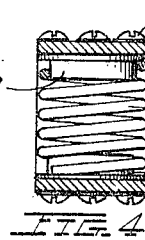

In the drawings, Figure 1 is a side elevation of my flexible coupling in place between a driving fly wheel and a driven spider; Fig. 2 is a diametric section through the coupling, as indicated by the line 2—2 in Fig. 1, looking upwardly; Fig. 3 is an edge view of the coupling, being a section on the line 3—3 of Fig. 1; Fig. 4 is a detail showing the method of holding the compression spring, being a section on the line 4—4 of Fig. 1; Fig. 5 is a side elevation on a reduced scale of my coupling embodied in a somewhat modified form.

In the drawing, 10 represents a driving member, as fly wheel, for example, mounted on a suitable shaft 11.

12 represents a driven member which is shown as a spider and is mounted on a shaft 13.

The shafts 11 and 13 may or may not be strictly in alinement.

In the form shown in Figs. 1 to 4 inclusive, I provide a polygon of links which are preferably made of flat strips of leather. In those sides of the polygon through which the normal driving is accomplished, I arrange two links side by side, designated $20^a$, while, for the alternate sides, which only drive on a relatively backward movement, one link $20^b$ is sufficient. This enables the single links to project at their ends between the double links $20^a$. Through the three links thus overlapping, extend bolts or pins which are connected alternately to the driving and driven members. Thus, as shown, the bolts $30^a$ are connected with the driving member 10, while the bolts $30^b$ are connected with the driven member 12.

The construction so far described is similar to that set out in my prior patent mentioned.

In the present embodiment, in place of having the flat strips which constitute the driving links $20^a$ parallel with each other throughout, I bow these strips outwardly and place between them a compression spring 40. This spring may be conveniently held in place by means of two heads 41, which have reduced bosses 43 extending into the coil of the spring and lie against the inner faces of the links and are secured thereto in a suitable manner, as by screws 42 screwing through the links into the heads.

It will be seen that such a spring construction as described enables a slight rotation of the driving or driven member independently of the other, whereby irregularities of driving need not be communicated to the driven member. The driven member naturally tends to lag behind the driving member and the springs are always under some compression, so that, if the driving member jerks forward, the springs are simply further compressed, and, reacting, spread the links and gently advance the driven member, as required, while if the driving member jerks relatively backward the springs spread and the uniform rotation of the driven member continues. When the coupling is in action the links 20$^b$ are somewhat bowed by the lag of the driven member, so that they do not interfere with the constant readjustment of the driving and driven members as above explained.

In place of arranging the double links of the polygon on opposite sides of a plane parallel with the driving wheel, I may arrange these links transversely to such plane, as shown in Fig. 5. Here, the two double links 20$^c$ may be each in reality a continuous band looped around the pin 30$^c$ connected with the driving member and the pin 30$^d$ connected with the driven member. Between the two reaches of such band a compression spring 40 may be secured in a manner similar to that already described. In this form, the alternate links which take the pull in a backward direction may be bands of less width and may loop about the bolts 30$^c$ and 30$^d$ through notches or openings in the wider bands 20$^c$.

It will be seen that, whether the embodiment is in the form shown in Fig. 1 or Fig. 5, it is a very simple device with little about it to get out of order, while practice has demonstrated that it is very efficient in relieving the driven member of troublesome momentary irregularities of the driver.

Having thus described my invention, what I claim is:—

1. In a flexible coupling, the combination, with a rotatable driving and a rotatable driven member, of a pair of links each consisting of a flexible strip, the two strips being placed side by side and secured both at one end to the driving member and both at the other end to the driven member, said links being intermediately bowed apart, and a compression spring held between the links and tending to force them apart.

2. In a flexible coupling, the combination, with a driving and a driven member, of a pair of links made of substantially flat pieces of leather and placed side by side and each secured at one end to the driving member and at the other end to the driven member, and spring means tending to bow them apart.

3. In a flexible coupling, the combination, with a driving and a driven member, of a polygon of leather links connected at its angles with the driving and driven members respectively, alternate sides of said polygon having each two link members side by side, compression springs located between such two link members, and heads secured to such two link members and positioning said springs.

4. In a flexible coupling, the combination, with a rotatable driving member and a rotatable driven member mounted side by side, of a pair of links each consisting of a flexible strip, the two strips being placed side by side and secured at one end to the driving member and at the other end to the driven member, and spring means between the links secured to them and tending to force them apart.

In testimony whereof, I hereunto affix my signature in the presence of two witnesses.

JOSEPH B. MERIAM.

Witnesses:
 ALBERT H. BATES,
 BRENNAN B. WEST.